United States Patent
Li et al.

(10) Patent No.: US 12,010,697 B2
(45) Date of Patent: Jun. 11, 2024

(54) METHOD AND APPARATUS FOR SUPPORTING MULTIPLE CONFIGURATION GRANTS FOR SIDELINK DATA TRANSMISSION

(71) Applicant: FUJITSU LIMITED, Kawasaki (JP)

(72) Inventors: Guorong Li, Beijing (CN); Lei Zhang, Beijing (CN); Xin Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 295 days.

(21) Appl. No.: 17/376,231

(22) Filed: Jul. 15, 2021

(65) Prior Publication Data
US 2021/0345397 A1 Nov. 4, 2021

Related U.S. Application Data

(63) Continuation of application No. PCT/CN2019/074967, filed on Feb. 13, 2019.

(51) Int. Cl.
*H04W 72/14* (2009.01)
*H04L 1/1812* (2023.01)
*H04W 72/23* (2023.01)
*H04W 92/18* (2009.01)

(52) U.S. Cl.
CPC ........... *H04W 72/23* (2023.01); *H04L 1/1819* (2013.01); *H04W 92/18* (2013.01)

(58) Field of Classification Search
CPC ..... H04W 12/122; H04W 4/10; H04W 8/005; H04W 48/02; H04W 40/24; H04W 48/16; H04W 12/08; G05D 1/0088; G05D 2201/0213; G08G 1/164
See application file for complete search history.

(56) References Cited

U.S. PATENT DOCUMENTS

| | | | |
|---|---|---|---|
| 2006/0075119 A1* | 4/2006 | Hussain | H04L 69/163 709/227 |
| 2018/0049079 A1* | 2/2018 | Ozturk | H04W 36/08 |
| 2019/0335496 A1* | 10/2019 | Li | H04L 1/1887 |
| 2020/0021402 A1 | 1/2020 | Xu et al. | |
| 2020/0322980 A1* | 10/2020 | Fakoorian | H04W 72/23 |

FOREIGN PATENT DOCUMENTS

CN 108631964 A 10/2018

OTHER PUBLICATIONS

"Discussion on NR support for multiple active UL configured grants" USA. Nov. 12-16, 2018 (Year: 2018).*
(Continued)

*Primary Examiner* — Mewale A Ambaye
(74) *Attorney, Agent, or Firm* — Myers Wolin, LLC

(57) ABSTRACT

Information transmission and reception methods and apparatuses thereof. The method includes: a terminal equipment being configured with and/or activated at least two configuration grants (CGs), the at least two configuration grants being respectively configured with corresponding HARQ processes, or timers of hybrid automatic repeat request processes of the at least two configuration grants being respectively started or stopped according to configurations of the at least two configuration grants.

9 Claims, 6 Drawing Sheets

(56) References Cited

OTHER PUBLICATIONS

International Search Report and Written Opinion of the International Searching Authority issued by the China National Intellectual Property Administration for corresponding International Patent Application No. PCT/CN2019/074967, dated Oct. 30, 2019, with an English translation.
Huawei et al., "Discussion on NR support for multiple active UL configured grants", Agenda Item: 11.4.3; 3GPP TSG-RAN WG2 Meeting #104, R2-1818202, Spokane, USA, Nov. 12-16, 2018.
Huawei et al., "Transmission with configured grant for NR-U", Agenda Item: 11.2.1.2; 3GPP TSG-RAN WG2 Meeting #104, R2-1816601, Spokane, USA, Nov. 12-16, 2018.
Notice of Termination of Reconsideration by Examiners before Appeal Proceedings and Reconsideration Report by Examiner before Appeal issued by the Japan Patent Office for corresponding Japanese Patent Application No. 2021-545468, mailed on Feb. 21, 2023, with an English translation.
Notice of Reasons for Refusal issued by the Japan Patent Office for corresponding Japanese Patent Application No. 2021-545468, dated Jun. 28, 2022, with an English translation.
NTT Docomo, Inc., "Enhanced UL transmission with configured grant for URLLC", Agenda Item: 7.2.6.3, 3GPP TSG-RAN WG1 Ad-Hoc Meeting 1901, R1-1900974, Taipei, Jan. 21-25, 2019.
First Notification of Office Action and Search Report issued by the China National Intellectual Property Administration for corresponding Chinese Patent Application No. 201980088795.7, dated Jun. 1, 2023, with an English translation.

\* cited by examiner

METHOD AND APPARATUS FOR SUPPORTING MULTIPLE CONFIGURATION GRANTS FOR SIDELINK DATA TRANSMISSION

CROSS-REFERENCE TO RELATED APPLICATION

This application is a continuation application of International Application PCT/CN2019/074967 filed on Feb. 13, 2019 and designated the U.S., the entire contents of which are incorporated herein by reference.

TECHNICAL FIELD

This disclosure relates to the field of communication technologies, and in particular to information transmission and reception methods and apparatuses thereof.

BACKGROUND

For uplink data transmission of a terminal equipment, in addition to a dynamic uplink grant notified via a physical downlink control channel (PDCCH), a configured uplink grant, which may hereinafter be referred to as an uplink CG, may also be used by a network device. The uplink CG may be used by the network device to allocate uplink resources for transmission of initial hybrid automatic repeat request (HARD) of the terminal equipment.

Currently, two types of uplink CGs are defined. In Type 1, an uplink CG (including a period, and a resource, etc.) may directly be provided by a radio resource control (RRC) message. In Type 2, a period of an uplink CG may be defined by an RRC message, and a PDCCH addressed to a CS-RNTI may notify and activate or deactivate the uplink CG; that is, the PDCCH addressed to the CS-RNTI indicates that the uplink CG may be implicitly reused according to the period defined by the RRC message, until it is deactivated.

In a New Radio (NR) system, in a serving cell, a terminal equipment may be configured with and activated at most one uplink CG, and for each bandwidth part (BWP), at most one uplink CG may be configured.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

In NR Rel-16, it is agreed in the 3rd Generation Partnership Project (3GPP) that for an advanced V2X application scenario, when a Uu interface is used for transmission, NR supports that there are multiple active configuration grants (CGs) in a given cell and a given BWP. In addition, in works related to an NR sidelink, whether to support multiple configuration grants for sidelink data transmission is also under discussion.

However, it was found by the inventors that when there are more than one active uplink or sidelink configuration grants (CGs) in a given cell and a given BWP of a terminal equipment, there exists a problem that some CGs cannot be used due to a shared HARQ process.

Addressed to at least one of the above problems, embodiments of this disclosure provide information transmission and reception methods and apparatuses thereof.

According to a first aspect of the embodiments of this disclosure, there is provided an information transmission method, including:

a terminal equipment being configured with and/or activated at least two configuration grants, the at least two configuration grants being respectively configured with corresponding hybrid automatic repeat request processes; and transmitting uplink data or sidelink data by the terminal equipment by using the at least two configuration grants.

According to a second aspect of the embodiments of this disclosure, there is provided an information transmission apparatus, including:

a configuring unit configured to be configured with and/or activated at least two configuration grants, the at least two configuration grants being respectively configured with corresponding hybrid automatic repeat request processes; and a transmitting unit configured to transmit uplink data or sidelink data by using the at least two configuration grants.

According to a third aspect of the embodiments of this disclosure, there is provided an information transmission method, including:

a terminal equipment being configured with and/or activated at least two configuration grants, timers of hybrid automatic repeat request processes of the at least two configuration grants being respectively started or stopped according to configurations of the at least two configuration grants; and transmitting uplink data or sidelink data by the terminal equipment by using the at least two configuration grants.

According to a fourth aspect of the embodiments of this disclosure, there is provided an information transmission apparatus, including:

a configuring unit configured to be configured with and/or activated at least two configuration grants, timers of hybrid automatic repeat request processes of the at least two configuration grants being respectively started or stopped according to configurations of the at least two configuration grants; and a transmitting unit configured to transmit uplink data or sidelink data by using the at least two configuration grants.

According to a fifth aspect of the embodiments of this disclosure, there is provided an information reception method, including:

receiving, by a network device or a second terminal equipment, uplink data or sidelink data transmitted by a first terminal equipment by using at least two configuration grants, the first terminal equipment being configured with and/or activated the at least two configuration grants, the at least two configuration grants being respectively configured with corresponding hybrid automatic repeat request processes, or timers of hybrid automatic repeat request processes of the at least two configuration grants being respectively started or stopped according to configurations of the at least two configuration grants.

According to a sixth aspect of the embodiments of this disclosure, there is provided an information reception apparatus, including:

a receiving unit configured to receive uplink data or sidelink data transmitted by a first terminal equipment by using at least two configuration grants, the first terminal equipment being configured with and/or activated the at least two configuration grants, the at least two configuration grants being respectively configured with corresponding hybrid automatic repeat request processes, or timers of hybrid automatic repeat request processes of the at least two configuration grants being respectively started or stopped according to configurations of the at least two configuration grants.

An advantage of the embodiments of this disclosure exists in that the terminal equipment is configured with and/or activated at least two configuration grants (CGs), the at least two configuration grants being respectively configured with corresponding HARQ processes, or timers of hybrid automatic repeat request processes of the at least two configuration grants being respectively started or stopped according to configurations of the at least two configuration grants. Hence, in a case where multiple uplink CGs or sidelink CGs are configured, CG resources is fully utilized, resource utilization is improved, throughput of data of different service types is increased, and the solution is simple to be implemented.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment.

DETAILED DESCRIPTION OF THE DISCLOSURE

Figure 1:
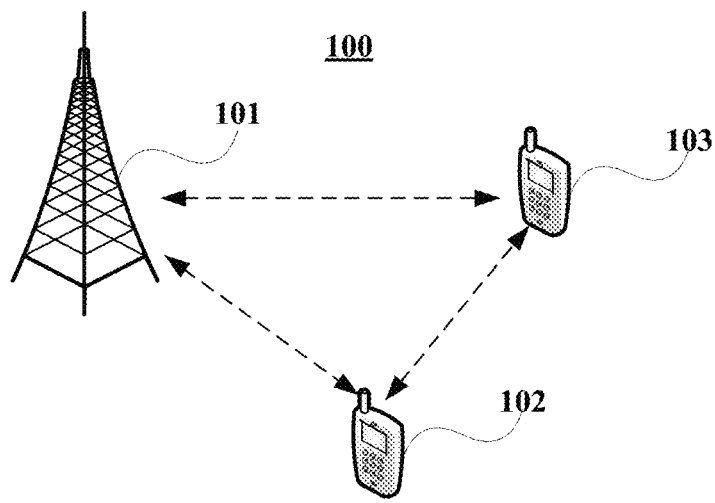
FIG. 1 is schematic diagram of a communication system of an embodiment of this disclosure.

These and further aspects and features of this disclosure will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to an equipment in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" or "terminal equipment (TE) or terminal device" refers to, for example, equipment accessing to a communication network and receiving network services via a network device. The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Moreover, the term "network side" or "network device side" refers to a side of a network, which may be a base station, and may include one or more network devices described above. The term "user side" or "terminal side" or "terminal equipment side" refers to a side of a user or a terminal, which may be a UE, and may include one or more terminal equipments described above.

Scenarios in the embodiments of this disclosure shall be described below by way of examples; however, this disclosure is not limited thereto.

FIG. 1 is a schematic diagram of a communication system of an embodiment of this disclosure, in which a case where terminal equipments and a network device are taken as examples is schematically shown. As shown in FIG. 1, a communication system 100 may include a network device 101 and terminal equipments 102, 103. For the sake of simplicity, an example having only two terminal equipments and one network device is schematically given in FIG. 1; however, the embodiment of this disclosure is not limited thereto.

In the embodiment of this disclosure, existing traffics or traffics that may be implemented in the future may be performed between the network device 101 and the terminal equipments 102, 103. For example, such traffics may include but not limited to an enhanced mobile broadband (eMBB), massive machine type communication (MTC), and ultra-reliable and low-latency communication (URLLC), etc.

It should be noted that FIG. 1 shows that two terminal equipments 102, 103 are both within a coverage of the network device 101. However, this disclosure is not limited thereto, and the two terminal equipments 102, 103 may not be within the coverage of the network device 101, or one terminal equipment 102 is within the coverage of the network device 101 and the other terminal equipment 103 is outside the coverage of the network device 101.

In the embodiments of this disclosure, sidelink transmission may be performed between two terminal equipments 102, 103. For example, the two terminal equipments 102, 103 may both perform sidelink transmission within the coverage of the network device 101 to implement V2X communications, or both of them may perform sidelink transmission outside the coverage of the network device 101 to implement V2X communications, and it may also be that one terminal equipment 102 is within the coverage of the network device 101 and another terminal equipment 103 is outside the coverage of the network device 101 and perform sidelink transmission to implement V2X communications.

In the embodiment of this disclosure, both uplink data transmission and sidelink data transmission are applicable. The configuration grant (CG) in the embodiments of this disclosure may refer to either the uplink CG or the sidelink CG, which shall not be distinguished below without causing confusion.

In NR Rel-15, in a specific uplink CG configuration, a parameter nrofHARQ-Processes indicates the number of HARQ processes that is used for a CG. For an uplink CG, the following formula may be used to derive an HARQ process ID used for processing the uplink CG:

$$\text{HARQ Process ID} = [\text{floor}(\text{CURRENT\_symbol}/\text{periodicity})] \text{ modulo nrofHARQ-Processes};$$

where, floor( ) denotes a rounded down operation, modulo( ) denotes a modulo operation, and CURRENT_symbol denotes a current symbol where the configuration grant is located, which may be calculated by using the following formula: CURRENT_symbol=(SFN×numberOfSlotsPerFrame×numberOfSymbolsPerSlot+(slot number in the frame)×numberOfSymbolsPerSlot+(symbol number in the slot)); where, numberOfSlotsPerFrame and numberOfSymbolsPerSlot refer to the number of consecutive slots of each radio frame and the number of consecutive symbols of each slot. Reference may be made to related techniques in NR Rel-15 for details of this part.

It may be found from the above formula that HARQ process IDs used by a CG will be {0, . . . , nrofHARQ-Processes−1}. Therefore, when multiple CGs are activated, at least one HARQ process will be shared and used by different CGs.

When a CG is processed by the HARQ process and transmission on this grant is executed, a CG timer configuredGrantTimer corresponding to this HARQ process will be started or restarted. When the CG timer is running, the corresponding HARQ process cannot be used to process a newly arrived CG, so as to avoid interrupting possible HARQ retransmission of a previously transmitted media access control (MAC) protocol data unit (PDU).

Figure 2:
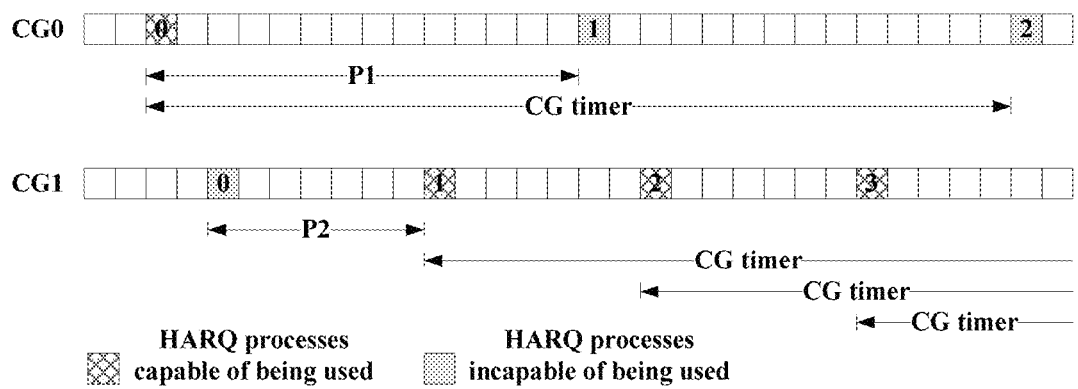
FIG. 2 is a schematic diagram of an example of an HARQ process to which a CG corresponds in NR Rel-15.

FIG. 2 is a schematic diagram of an example of an HARQ process to which a CG corresponds in NR Rel-15. As shown in FIG. 2, for example, both CG0 and CG1 are activated, wherein a period of CG0 is P1, that is, the period is 14 symbols, and period of CG1 is P2, that is, the period is 7 symbols.

Assuming that the number of HARQ processes (nrofHARQ-Processes) configured for a UE for CG is 4, according to the above formula, both CG0 and CG1 may use HARQ processes 0, 1, 2, 3. After HARQ process 0 is used by CG0, HARQ process 0 can be used by CG1 no longer while the CG timer is running; after HARQ process 1 is used by CG1, HARQ process 1 can be used by CG0 no longer while the CG timer is running, and so on. Therefore, as shown in FIG. 2, even if multiple CG resources do not overlap in time, these CG resources cannot be fully utilized due to limitation of operations of the HARQ process, hence, resource efficiency is greatly reduced.

Therefore, when there are more than one active uplink or sidelink configuration grants (CGs) in a given cell and a given BWP of a terminal equipment, there exists a problem that some CGs cannot be used due to a shared HARQ process.

Embodiment 1

The embodiments of this disclosure provide an information transmission method, which shall be described from a first terminal equipment side. Taken as a transmitting device of information, the first terminal equipment may transmit sidelink data to a second terminal equipment, and may transmit uplink data to a network device.

Figure 3:
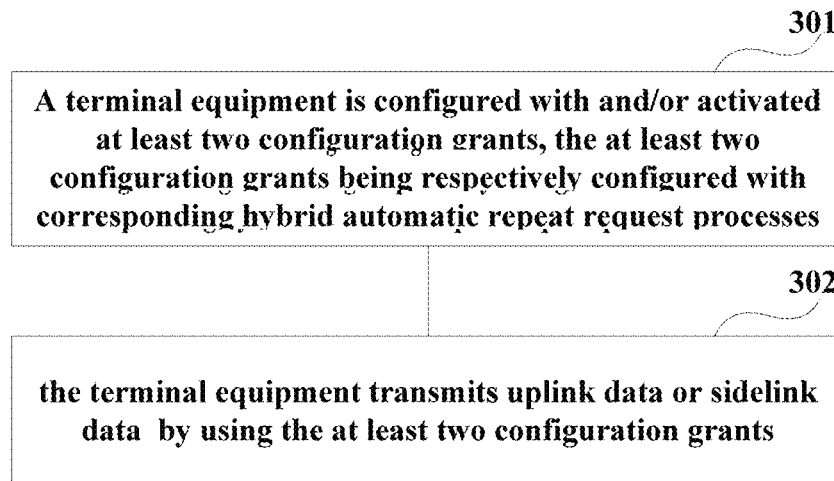
FIG. 3 is a schematic diagram of the information transmission method of an embodiment of this disclosure.

FIG. 3 is a schematic diagram of the information transmission method of the embodiment of this disclosure. As shown in FIG. 3, the method includes:

step 301: a terminal equipment is configured with and/or activated at least two configuration grants, the at least two configuration grants being respectively configured with corresponding hybrid automatic repeat request processes; and step 302: the terminal equipment transmits uplink data or sidelink data by using the at least two configuration grants.

It should be noted that FIG. 3 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 3.

In an embodiment, the at least two configuration grants include a first configuration grant and a second configuration grant, at least one HARQ process to which the first configuration grant corresponds and at least one HARQ process to which the second configuration grant corresponds are at least partially different.

For example, CG0 corresponds to a HARQ process set {H0}, and CG1 corresponds to a HARQ process set {H1}, {H0} and {H1} are two sets having elements that are completely different, or two sets having elements that are partially different and having intersections. Thus, HARQ processes used by different CGs can be distinguished.

Figure 4:
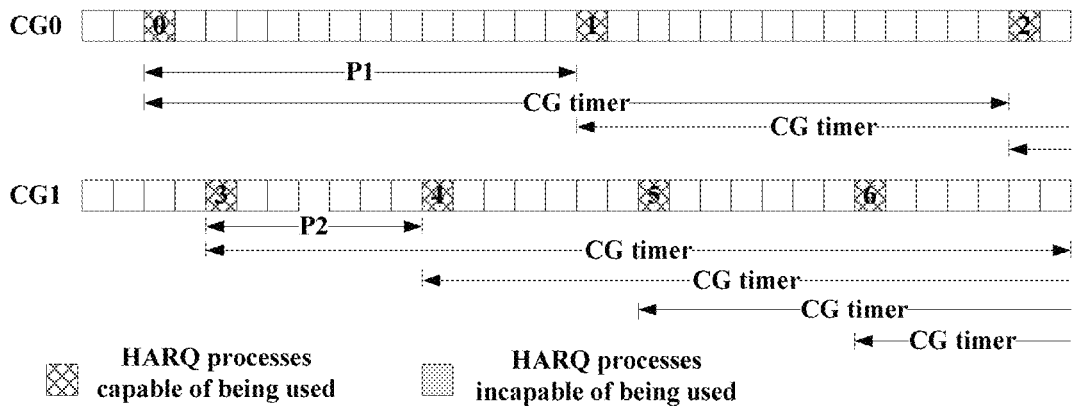
FIG. 4 is a schematic diagram of an example of an HARQ process to which a CG corresponds in the embodiment of this disclosure.

FIG. 4 is a schematic diagram of an example of an HARQ process to which a CG corresponds in the embodiment of this disclosure. As shown in FIG. 4, for example, both CG0 and CG1 are activated; wherein a period of CG0 is P1, that is, the period is 14 symbols, and a period of CG1 is P2, that is, the period is 7 symbols.

As shown in FIG. 4, CG0 and CG1 are respectively configured with corresponding HARQ processes. For example, CG0 may use HARQ processes 0, 1 and 2, and CG1 may use HARQ processes 3, 4, 5 and 6. Therefore, as shown in FIG. 4, multiple CG resources do not overlap in time, and the use of different HARQ processes may avoid or reduce restrictions on operations of the HARQ processes, and these CG resources may be fully utilized, thereby improving resource efficiency.

How to configure CGs shall be further explained below.

Figure 5:
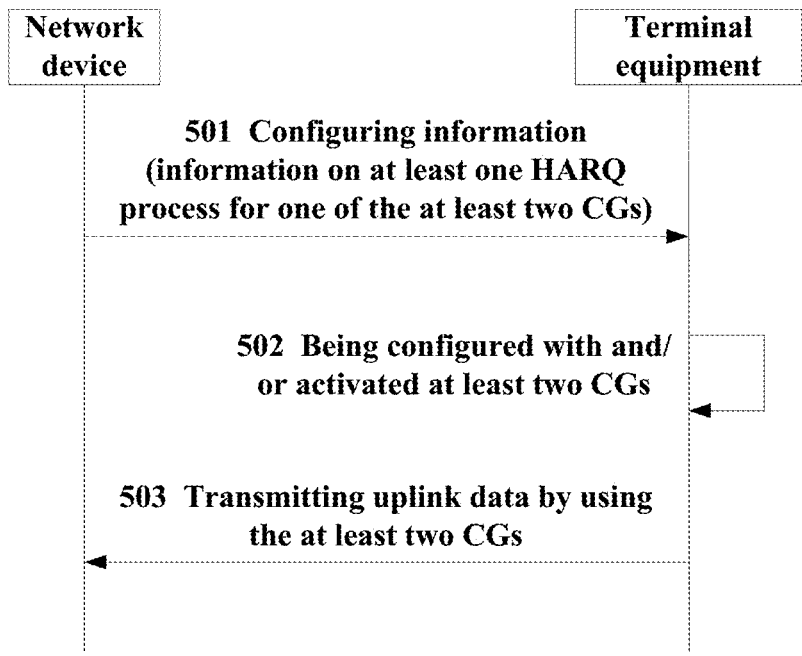
FIG. 5 is another schematic diagram of the information transmission method of the embodiment of this disclosure.

FIG. 5 is another schematic diagram of the information transmission method of the embodiment of this disclosure, which shall be described by taking uplink data transmission as an example. A case of sidelink data transmission is similar to that of FIG. 5, which shall not be described herein any further.

As shown in FIG. 5, the method includes:

step 501: a network device transmits configuration information to a terminal equipment, the configuration information configuring information on at least one HARQ process for one of the at least two CGs; wherein the configuration information may be carried by an RRC message, however, this disclosure is not limited thereto, for example, it may also be other messages or signaling;

step 502: the terminal equipment is configured with and/or activated at least two CGs;

wherein the at least two CGs are respectively configured with corresponding HARQ processes; and step 503: the terminal equipment transmits uplink data by using the at least two CGs.

It should be noted that FIG. 5 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 5.

In an embodiment, the configuration information includes a configuration index of the configuration grant and a start identifier of at least one hybrid automatic repeat request process.

For example, assuming that the terminal equipment supports at most 16 HARQ processes, or the terminal equipment is configured to use 16 HARQ processes (such as being used for CGs), and is configured with 4 CG configurations with indices 0, 1, 2 and 3, respectively, the configuration information in the RRC message may be as shown in Table 1:

TABLE 1

| CG configuration index i | HARQ process start ID (i) |
| --- | --- |
| 0 | 0 |
| 1 | 3 |
| 2 | 7 |
| 3 | 12 |

At the terminal equipment side, according to HARQ process start IDs of different CGs, it may be derived that the number of HARQ processes that may be used by CG configuration index i is a difference between a start identifier of an index (i+1) and the start identifier of index i, and which HARQ processes may be used by CG configuration index i may also be derived. For example, according to the configuration in Table 1, HARQ process IDs used by CG0 are 0-2, HARQ process IDs used by CG1 are 3-6, HARQ process IDs used by CG2 are 7-11, and HARQ process IDs used by CG3 are 12-15.

In a specification for an MAC layer, for example, an identifier of the hybrid automatic repeat request process to which the configuration grant i corresponds may be calculated by using the following formula:

HARQ Process ID($i$)=[floor(CURRENT_symbol/ periodicity($i$))]modulo[HARQ process start ID($i$+1)−HARQ process start ID($i$)]+HARQ process start ID($i$);

where, HARQ Process ID ($i$) is the identifier of the hybrid automatic repeat request process corresponding to the configuration grant i, floor( ) denotes a rounded down operation, modulo( ) denotes a modulo operation, CURRENT_symbol denotes a current symbol where the configuration grant i is located, which may be, for example, calculated by using the following formula: CURRENT_symbol=(SFN×numberOfSlotsPerFrame×numberOfSymbolsPerSlot+(slot number in the frame)×numberOfSymbolsPerSlot+(symbol number in the slot)); where, numberOfSlotsPerFrame and numberOfSymbolsPerSlot refer to the number of consecutive slots of each radio frame and the number of consecutive symbols of each slot; periodicity (i) denotes a periodicity of the configuration grant i, HARQ process start ID (i) denotes the start identifier configured for the configuration grant i, and i denotes a configuration index of the configuration grant or an index of the configuration grant in a configuration grant list.

Therefore, it may be ensured in configuration that HARQ process start IDs of the CGs will not be identical, so as to distinguish their HARQ processes.

In another embodiment, the configuration information includes a configuration index of the configuration grant and at least one end identifier of the hybrid automatic repeat request process.

For example, assuming that the terminal equipment supports at most 16 HARQ processes, or the terminal equipment is configured to use 16 HARQ processes (such as being used for CGs), and is configured with 4 CG configurations with indices 0, 1, 2 and 3, respectively, the configuration information in the RRC message may be as shown in Table 2:

TABLE 2

| CG configuration index i | HARQ process end ID (i) |
|---|---|
| 0 | 2 |
| 1 | 6 |
| 2 | 11 |
| 3 | 15 |

Likewise, at the terminal equipment side, according to HARQ process end IDs of different CGs, assuming that an HARQ process ID of CG configuration 0 starts from 0, it may be derived that the number of HARQ processes that may be used by CG configuration index i is a difference between an end identifier of the index i and an end identifier of an index (i−1), and which HARQ processes may be used by CG configuration index i may also be derived. For example, according to the configuration in Table 2, HARQ process IDs used by CG2 are 7-11, and HARQ process IDs used by CG3 are 12-15.

In a specification for an MAC layer, for example, an identifier of the hybrid automatic repeat request process to which the configuration grant i corresponds may be calculated by using the following formula:

HARQ Process ID(i)=[floor(CURRENT_symbol/periodicity(i))]modulo[HARQ process end ID(i)−HARQ process end ID(i−1)]+HARQ process end ID(i−1)+1;

where, HARQ Process ID (i) is the identifier of the hybrid automatic repeat request process corresponding to the configuration grant i, floor( ) denotes a rounded down operation, modulo( ) denotes a modulo operation, CURRENT_symbol denotes a current symbol (index) where the configuration grant i is located, which may be, for example, calculated by using the following formula: CURRENT_symbol=(SFN×numberOfSlotsPerFrame×numberOfSymbolsPerSlot+(slot number in the frame)×numberOfSymbolsPerSlot+(symbol number in the slot)); where, numberOfSlotsPerFrame and numberOfSymbolsPerSlot refer to the number of consecutive slots of each radio frame and the number of consecutive symbols of each slot; periodicity (i) denotes a periodicity of the configuration grant i, HARQ process end ID (i) denotes the end identifier configured for the configuration grant i, and i denotes a configuration index of the configuration grant or an index of the configuration grant in a configuration grant list.

In another embodiment, the configuration information includes a configuration index of the configuration grant and the number of the hybrid automatic repeat request processes.

For example, the HARQ process ID corresponding to CG configuration index 0 starts from 0 by default, and the HARQ processes corresponding to the CGs are continuously allocated. For example, the configuration information may be as shown in Table 3:

TABLE 3

| CG configuration index i | nrofHARQ-Processes (i) |
|---|---|
| 0 | 3 |
| 1 | 4 |
| 2 | 4 |
| 3 | 4 |

At the terminal equipment side, according to nrofHARQ-Processes configured for different CGs, HARQ processes that may be used by CG configuration index i may be derived. For example, HARQ process IDs used by CG0 are 0-2 (3 processes), HARQ process IDs used by CG1 are 3-6 (4 processes), HARQ process IDs used by CG2 are 7-10 (4 processes), and HARQ process IDs used by CG3 are 11-14 (4 processes).

In a specification for an MAC layer, for example, an identifier of the hybrid automatic repeat request process to which the configuration grant i corresponds may be calculated by using the following formula:

HARQ Process ID(i)=[floor(CURRENT_symbol/periodicity(i))]modulo nrofHARQ-Processes(i)+sum[nrofHARQ-Processes(0)++nrofHARQ-Processes(i−1)];

where, HARQ Process ID (i) is the identifier of the hybrid automatic repeat request process corresponding to the configuration grant i, floor( ) denotes a rounded down operation, modulo( ) denotes a modulo operation, sum( ) denotes a summation operation, CURRENT_symbol denotes a current symbol (index) where the configuration grant i is located, which may be, for example, calculated by using the following formula: CURRENT_symbol=(SFN×numberOfSlotsPerFrame×numberOfSymbolsPerSlot+(slot number in the frame)×numberOfSymbolsPerSlot+(symbol number in the slot)); where, numberOfSlotsPerFrame and numberOfSymbolsPerSlot refer to the number of consecutive slots of each radio frame and the number of consecutive symbols of each slot; periodicity (i) denotes a periodicity of the configuration grant i, nrofHARQ-Processes (i) denotes the number of the hybrid automatic repeat request processes configured for the configuration grant i, and i denotes a configuration index of the configuration grant or an index of the configuration grant in a configuration grant list.

In another embodiment, the configuration information includes the configuration index of the configuration grant, a start identifier of at least one of the hybrid automatic repeat request processes and the number of the hybrid automatic repeat request processes.

For example, the configuration information may be as shown in Table 4:

TABLE 4

| CG configuration index i | HARQ process start ID (i) | nrofHARQ-Processes (i) |
|---|---|---|
| 0 | 0 | 3 |
| 1 | 4 | 4 |
| 2 | 8 | 4 |
| 3 | 12 | 4 |

At the terminal equipment side, according to nrofHARQ-ProcessesHARQ and process start IDs configured for different CGs, HARQ processes that may be used by CG configuration index i may be derived. For example, HARQ process IDs used by CG0 are 0-2, HARQ process IDs used by CG1 are 4-7, HARQ process IDs used by CG2 are 8-11, and HARQ process IDs used by CG3 are 12-15.

In a specification for an MAC layer, for example, an identifier of the hybrid automatic repeat request process to which the configuration grant i corresponds may be calculated by using the following formula:

$$\text{HARQ Process ID}(i) = [\text{floor}(\text{CURRENT\_symbol}/\text{periodicity}(i))] \text{ modulo nrofHARQ-Processes}(i) + \text{HARQ process start ID}(i);$$

where, HARQ Process ID (i) is the identifier of the hybrid automatic repeat request process corresponding to the configuration grant i, floor( ) denotes a rounded down operation, modulo( ) denotes a modulo operation, CURRENT_symbol denotes a current symbol (index) where the configuration grant i is located, which may be, for example, calculated by using the following formula: CURRENT_symbol=(SFN×numberOfSlotsPerFrame×numberOfSymbolsPerSlot+(slot number in the frame)×numberOfSymbolsPerSlot+(symbol number in the slot)); where, numberOfSlotsPerFrame and numberOfSymbolsPerSlot refer to the number of consecutive slots of each radio frame and the number of consecutive symbols of each slot; periodicity (i) denotes a periodicity of the configuration grant i, HARQ process start ID (i) denotes the start identifier configured for the configuration grant i, nrofHARQ-Processes (i) denotes the number of the hybrid automatic repeat request processes configured for the configuration grant i, and i denotes a configuration index of the configuration grant or an index of the configuration grant in a configuration grant list.

In this embodiment, some HARQ processes may not be used by the CGs, and may be processed for dynamic grants. In addition, the HARQ process end ID (i) and the number of HARQ processes nrofHARQ-Processes (i) may also be configured, procedures of which being similar to the above, and being not going to be described herein any further.

In another embodiment, the configuration information includes a configuration index of the configuration grant and an identifier of at least one of the hybrid automatic repeat request processes.

For example, which HARQ processes may be used by CG configuration may be configured, and the configuration information may be as shown in Table 5.

TABLE 5

| CG configuration index i | HARQ process ID(s) |
|---|---|
| 0 | 0, 1, 2 |
| 1 | 3, 4, 5, 6 |
| 2 | 7, 8, 9, 10 |
| 3 | 11, 12, 13, 14 |

For example, the index of the hybrid automatic retransmission request process corresponding to the configuration grant i is calculated by using the following formula:

$$\text{HARQ Process index}(i) = [\text{floor}(\text{CURRENT\_symbol}/\text{periodicity}(i))] \text{ modulo nrofHARQ-Processes}(i);$$

where, HARQ Process index (i) is the identifier of the hybrid automatic repeat request process corresponding to the configuration grant i, floor( ) denotes a rounded down operation, modulo( ) denotes a modulo operation, CURRENT_symbol denotes a current symbol (index) where the configuration grant i is located, which may be, for example, calculated by using the following formula: CURRENT_symbol=(SFN×numberOfSlotsPerFrame×numberOfSymbolsPerSlot+(slot number in the frame)×numberOfSymbolsPerSlot+(symbol number in the slot)); where, numberOfSlotsPerFrame and numberOfSymbolsPerSlot refer to the number of consecutive slots of each radio frame and the number of consecutive symbols of each slot; periodicity (i) denotes a periodicity of the configuration grant i, nrofHARQ-Processes (i) denotes the number of the hybrid automatic repeat request processes configured for the configuration grant i, and i denotes a configuration index of the configuration grant or an index of the configuration grant in a configuration grant list.

At the terminal equipment side, the identifier of the hybrid automatic repeat request process corresponding to the configuration grant i may be determined according to the HARQ Process index (i). For example, according to Table 5, the number of HARQ processes that may be used by CG configuration index 1 is 4, and according to the above calculation formula of the HARQ Process index, the HARQ process indices corresponding to the resources of the CG are 0, 1, 2 and 3. And according to the configuration corresponding to Table 5, corresponding HARQ process IDs are 3, 4, 5 and 6.

The method for calculating the HARQ process index in this embodiment may also be applied to the previous embodiments, that is, the terminal equipment side calculates an HARQ process index to which a CG resource corresponds according to the formula HARQ Process index (i)=[floor(CURRENT_symbol/periodicity(i))] modulo nrofHARQ-Processes (i), and then finds a corresponding HARQ process identifier according to corresponding configuration in tables 1-4.

In an embodiment, the terminal equipment may also configure HARQ processes respectively for the at least two configuration grants according to the number of HARQ processes that may be used by a configuration grant or a total number of HARQ processes that may be used by the at least two configuration grants. The number of HARQ processes that may be used by the configuration grant or the total number of HARQ processes that may be used by the at least two configuration grants may be predefined, or may also be configured by the network device.

For example, the numbers of HARQ processes of the CG configurations are identical, and are sequentially allocated starting from 0 according to indices of the CGs. Assuming that the total number of HARQ processes configured for multiple CGs of the terminal equipment is 8, or the number of HARQ processes used by a CG is 2, at the terminal equipment side, the HARQ processes of the CGs are evenly allocated, and the HARQ processes allocated for the CGs in Table 6 are derived.

TABLE 6

| CG configuration index i | HARQ Process ID(s) |
|---|---|
| 0 | 0, 1 |
| 1 | 2, 3 |
| 2 | 4, 5 |
| 3 | 6, 7 |

In a specification for an MAC layer, for example, an identifier of the hybrid automatic repeat request process to which the configuration grant i corresponds may be calculated by using the following formula:

$$\text{HARQ Process ID}(i) = [\text{floor}(\text{CURRENT\_symbol}/\text{periodicity}(i))] \text{ modulo } [\text{nrofHARQ-Processes}/\text{nrofconfiguredgrant}] + (\text{nrofHARQ-Processes}/\text{nrofconfiguredgrant})*i;$$

where, HARQ Process index (i) is the identifier of the hybrid automatic repeat request process corresponding to the configuration grant i, floor( ) denotes a rounded down operation, modulo( ) denotes a modulo operation, CURRENT_symbol denotes a current symbol (index) where the configuration grant i is located, which may be, for example, calculated by using the following formula: CURRENT_symbol=(SFN×numberOfSlotsPerFrame×numberOfSymbolsPerSlot+(slot number in the frame)×numberOfSymbolsPerSlot+(symbol number in the slot)); where, numberOfSlotsPerFrame and numberOfSymbolsPerSlot refer to the number of consecutive slots of each radio frame and the number of consecutive symbols of each slot; periodicity (i) denotes a periodicity of the configuration grant i, nrofHARQ-Processes (i) denotes a total number of the hybrid automatic repeat request processes, nrofconfiguredgrant denotes the number of the at least two configuration grants, and i denotes a configuration index of the configuration grant or an index of the configuration grant in a configuration grant list.

In an embodiment, the number of HARQ processes that may be used by the configuration grant may be determined by a length of a timer of the configuration grant and a periodicity of the configuration grant.

For example, the number of HARQ processes of a CG may be CG timer/period (a unit of a current CG timer is of a period, that is, a length of the CG timer is an integer multiple of the period). Assuming that a total number of HARQ processes configured for multiple configured grants of the terminal equipment is 8, CG0 timer is 2*CG0 period and CG1 timer is 4*CG1 period, it may be derived by the terminal device side through calculation that the number of HARQ processes of CG0 is CG0 timer/CG0 period=2, and the number of HARQ processes of CG1 is CG1 timer/CG1 period=4.

The above embodiments only illustrate this disclosure. However, this disclosure is not limited thereto, and appropriate variants may be made on the basis of these embodiments. For example, the above embodiments may be executed separately, or one or more of them may be executed in a combined manner.

It can be seen from the above embodiments that the terminal equipment is configured with and/or activated at least two configuration grants (CGs), the at least two configuration grants being respectively configured with corresponding HARQ processes. Hence, in a case where multiple uplink CGs or sidelink CGs are configured, CG resources is fully utilized, resource utilization is improved, throughput of data of different service types is increased, and the solution is simple to be implemented.

Embodiment 2

The embodiments of this disclosure provide an information transmission method, which shall be described from a first terminal equipment side. Taken as a transmitting device of information, the first terminal equipment may transmit sidelink data to a second terminal equipment, and may transmit uplink data to a network device.

Figure 6:
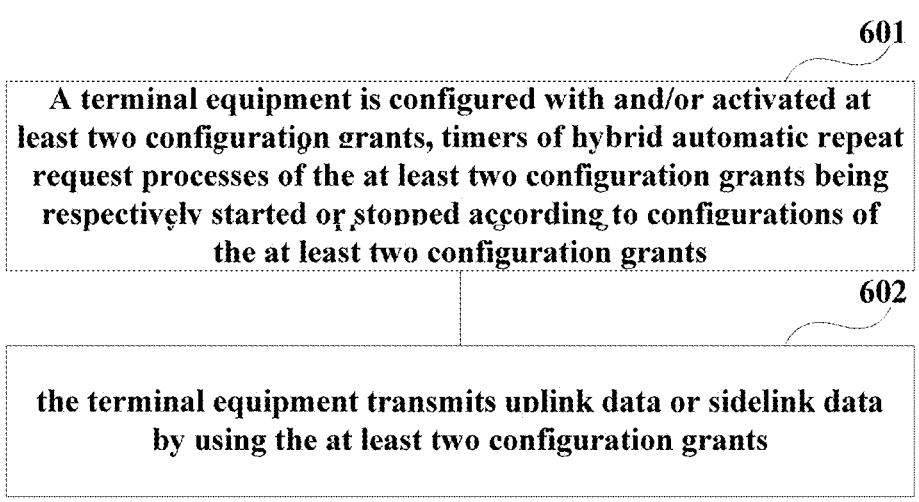
FIG. 6 is a further schematic diagram of the information transmission method of the embodiment of this disclosure.

FIG. 6 is a schematic diagram of the information transmission method of the embodiment of this disclosure. As shown in FIG. 6, the method includes:

step 601: a terminal equipment is configured with and/or activated at least two configuration grants, timers of hybrid automatic repeat request processes of the at least two configuration grants being respectively started or stopped according to configurations of the at least two configuration grants; and step 602: the terminal equipment transmits uplink data or sidelink data by using the at least two configuration grants.

It should be noted that FIG. 6 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 6.

When an HARQ process is occupied by the terminal equipment, corresponding CG configuration shall be taken into account when the CG timers are taken into account.

Table 7 exemplarily shows a modification to a specification for an MAC layer.

TABLE 7

For each Serving Cell and each configured uplink grant of a configured grant configuration, if configured and activated, the MAC entity shall:
  1> if the PUSCH duration of the configured uplink grant does not overlap with the PUSCH duration of an uplink grant received on the PDCCH for this Serving Cell:
    2> set the HARQ Process ID to the HARQ Process ID associated with this PUSCH duration;
    2> if the configuredGrantTimer for the corresponding HARQ process for the configured grant configuration is not running:
      3> consider the NDI bit for the corresponding HARQ process to have been toggled;
      3> deliver the configured uplink grant and the associated HARQ information to the HARQ entity.

Table 8 exemplarily shows a modification to UL grant reception.

TABLE 8

1> if an uplink grant for this Serving Cell has been received on the PDCCH for the MAC entity's C-RNTI or Temporary C-RNTI; or
...
   3> start or restart the configuredGrantTimer for the correponding HARQ process for the corresponding configured grant configuration, if configured.
...
1> else if an uplink grant for this PDCCH occasion has been received for this Serving Cell on the PDCCH for the MAC entity's CS-RNTI:
  2> if the NDI in the received HARQ information is 1:
    3> consider the NDI for the corresponding HARQ process not to have been toggled;
    3> start or restart the configuredGrantTimer for the corresponding HARQ process for the corresponding configured grant configuration, if configured;
    3> deliver the uplink grant and the associated HARQ information to the HARQ entity.
  2> else if the NDI in the received HARQ information is 0:
...
    3> else if PDCCH contents indicate configured grant Type 2 activation:
...
      4> stop the configuredGramtTimer for the corresponding HARQ process for the corresponding configured grant configuration, if running;
      4> deliver the configured uplink grant and the associated HARQ information to the HARQ entity.

Table 9 exemplarily shows a modification to an HARQ entity.

TABLE 9

...
For each uplink grant, the HARQ entity shall:
  1> identify the HARQ process of a configured grant configuration associated with this grant, and for each identified HARQ process of a configured grant configuration:
...
    3> if a MAC PDU to transmit has been obtained:
      4> deliver the MAC PDU and the uplink grant and the HARQ information of the TB to the identified HARQ process;
      4> instruct the identified HARQ process to trigger a new transmission;
      4> if the uplink grant is addressed to CS-RNTI; or
      4> if the uplink grant is a configured uplink grant; or
      4> if the uplink grant is addressed to C-RNTI, and the identified HARQ process is configured for a configured uplink grant:
        5> start or restart the conflguredGrantTimer, if configured, for the corresponding HARQ process for the corresponding configured grant configuration when the transmission is performed.

It should be noted that tables 7-9 only exemplarily show examples of modifying HARQ process operations. However, this disclosure is not limited thereto, and appropriate adjustment may be made according to what is described above.

In an embodiment, the at least two configuration grants include a first configuration grant and a second configuration grant, the first configuration grant and the second configuration grant using the same hybrid automatic repeat request process.

In an embodiment, the first configuration grant and the second configuration grant respectively use a timer of the same hybrid automatic repeat request process independently.

Figure 7:
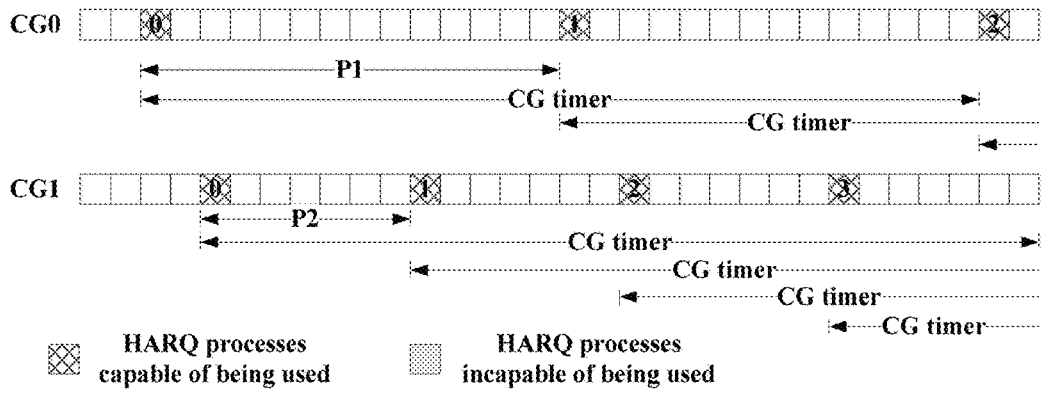
FIG. 7 is another schematic diagram of an example of the HARQ process to which a CG corresponds in the embodiment of this disclosure.

FIG. 7 is a schematic diagram of an example of the HARQ process to which a CG corresponds in the embodiment of this disclosure. As shown in FIG. 7, for example, both CG0 and CG1 are activated, wherein the period of CG0 is P1, that is, the period is of 14 symbols, and the period of CG1 is P2, that is, the period is of 7 symbols.

As shown in FIG. 7, CG0 and CG1 still share the HARQ processes. For example, CG0 and CG1 may still use HARQ processes 0, 1, 2 and 3; however, for example, CG0 and CG1 use respectively the timer of HARQ process 0 independently. For example, after CG0 occupies HARQ process 0, a corresponding CG timer is started. When CG1 determines whether it may occupy HARQ process 0, it needs only to consider whether the CG timer corresponding to HARQ process 0 of CG1 is running, and does not need to consider whether the timer of CG0 is running.

In an embodiment, the first configuration grant uses the first timer of the same hybrid automatic repeat request process, and the second configuration grant uses the second timer of the same hybrid automatic repeat request process.

Figure 8:
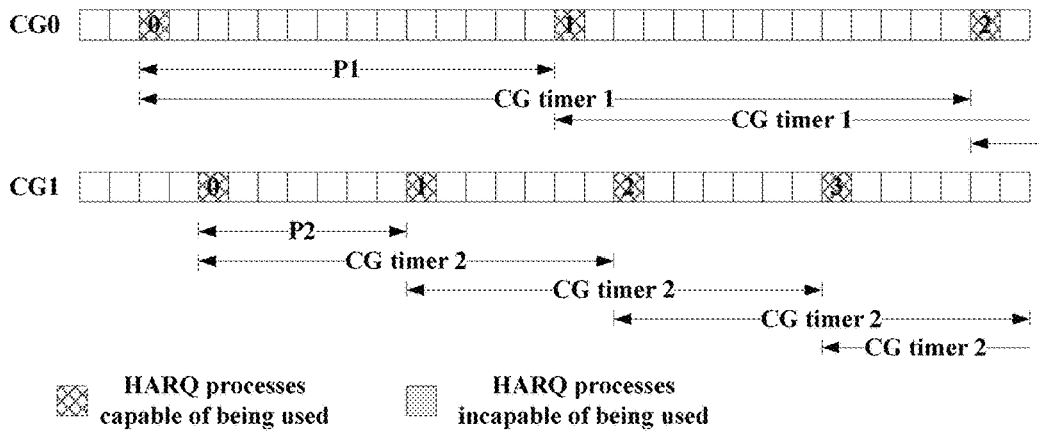
FIG. 8 is a further schematic diagram of an example of the HARQ process to which a CG corresponds in the embodiment of this disclosure.

FIG. 8 is a schematic diagram of an example of the HARQ process to which a CG corresponds in the embodiment of this disclosure. As shown in FIG. 8, for example, both CG0 and CG1 are activated, where a period of CG0 is P1, that is, the period is of 14 symbols, and the period of CG1 is P2, that is, the period is of 7 symbols.

As shown in FIG. 8, CG0 and CG1 still share the HARQ processes. For example, CG0 and CG1 may still use HARQ processes 0, 1, 2 and 3; however, for example, CG0 independently uses a CG timer 1 of HARQ process 0, and CG1 independently uses a CG timer 2 of HARQ process 0. For example, after CG0 occupies HARQ process 0, corresponding CG timer 1 is started. When CG1 judges whether it may occupy HARQ process 0, it needs only to consider whether CG timer 2 corresponding to HARQ process 0 of CG1 is running, and does not need to consider whether CG timer 1 of CG0 is running.

As shown in FIGS. 7 and 8, multiple CG resources do not overlap in time, which may avoid or reduce limits on operations of HARQ processes. These CG resources may be fully utilized, thereby improving resource efficiencies. However, as latter CGs may possibly occupy an HARQ process being run by a CG timer corresponding to a previous CG, retransmission of data corresponding to the HARQ process of the previous CG may possibly be affected. Hence, the embodiments of this disclosure are applicable to low-latency services having less high requirements on reliabilities.

It should be noted that description of FIG. 7 and FIG. 8 are exemplary only, however, this disclosure is not limited thereto. For example, different timers may be configured for different CGs and/or HARQ processes, or timers may be independently started for different CGs and/or HARQ processes, and so on.

In an embodiment, when the timer of the HARQ process of the first configuration grant is not running, the first configuration grant is used to transmit uplink data or sidelink data, and/or, when the timer of the HARQ process of the second configuration grant is not running, the second configuration grant is used to transmit uplink data or sidelink data.

The above embodiments only illustrate this disclosure. However, this disclosure is not limited thereto, and appropriate variants may be made on the basis of these embodiments. For example, the above embodiments may be executed separately, or one or more of them may be executed in a combined manner.

It can be seen from the above embodiments that the terminal equipment is configured with and/or activated at least two configuration grants (CGs), timers of HARQ processes of the at least two configuration grants being respectively started or stopped according to configurations of the at least two configuration grants. Hence, in a case where multiple uplink CGs or sidelink CGs are configured, CG resources is fully utilized, resource utilization is improved, throughput of data of different service types is increased, and the solution is simple to be implemented.

Embodiment 3

The embodiments of this disclosure provide an information reception method, which shall be described from a network device or second terminal equipment side. A first terminal equipment may transmit sidelink data to the second terminal equipment, and may transmit uplink data to the network device. Contents in the embodiments identical to those in embodiments 1 and 2 shall not be described herein any further.

Figure 9:
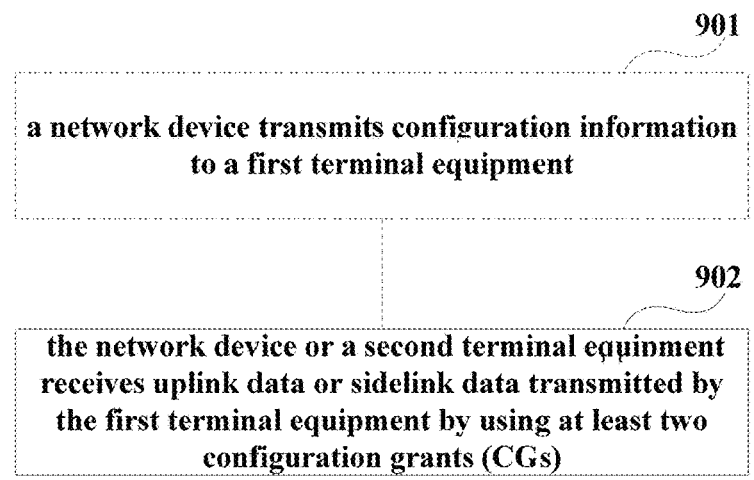
FIG. 9 is a schematic diagram of the information reception method of an embodiment of this disclosure.

FIG. 9 is a schematic diagram of the information reception method of the embodiment of this disclosure. As shown in FIG. 9, the method includes:

step 902: a network device or a second terminal equipment receives uplink data or sidelink data transmitted by a first terminal equipment by using at least two configuration grants (CGs), the first terminal equipment being configured with and/or activated the at least two configuration grants, wherein the at least two configuration grants being respectively configured with corresponding hybrid automatic repeat request processes, or timers of hybrid automatic repeat request processes of the at least two configuration grants being respectively started or stopped according to configurations of the at least two configuration grants.

In an embodiment, the at least two configuration grants include a first configuration grant and a second configuration grant, at least one hybrid automatic repeat request process corresponding to the first configuration grant and at least one hybrid automatic repeat request process corresponding to the second configuration grant are at least partially different.

In an embodiment, as shown in FIG. 9, the method may further include:

step 901: the network device transmits configuration information to the first terminal equipment; for example, the configuration information configures information of at least one hybrid automatic repeat request process for one of the configuration grants.

In an embodiment, the at least two configuration grants include a first configuration grant and a second configuration grant, the first configuration grant and the second configuration grant using the same hybrid automatic repeat request process.

The above embodiments only illustrate this disclosure. However, this disclosure is not limited thereto, and appropriate variants may be made on the basis of these embodiments. For example, the above embodiments may be executed separately, or one or more of them may be executed in a combined manner.

It can be seen from the above embodiments that the terminal equipment is configured with and/or activated at least two configuration grants (CGs), the at least two configuration grants being respectively configured with corresponding HARQ processes, or timers of HARQ processes of the at least two configuration grants being respectively started or stopped according to configurations of the at least two configuration grants. Hence, in a case where multiple uplink CGs or sidelink CGs are configured, CG resources is fully utilized, resource utilization is improved, throughput of data of different service types is increased, and the solution is simple to be implemented.

Embodiment 4

The embodiments of this disclosure provide an information transmission apparatus. The apparatus may be a terminal equipment, or may be one or more components or assemblies configured in a terminal equipment. Contents in the embodiments identical to those in embodiments 1 and 2 shall not be described herein any further.

Figure 10:
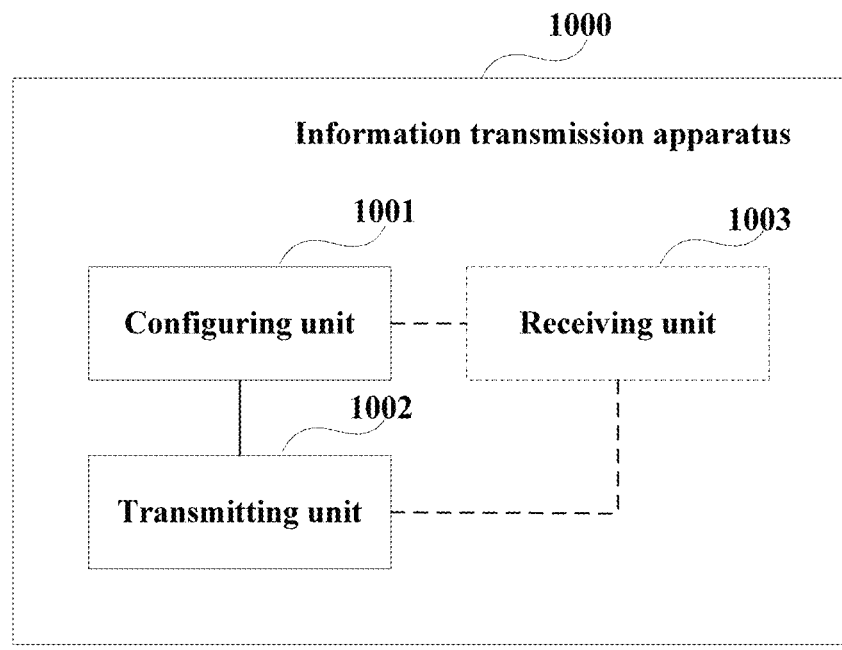
FIG. 10 is a schematic diagram of the information transmission apparatus of an embodiment of this disclosure.

FIG. 10 is a schematic diagram of the information transmission apparatus of the embodiment of this disclosure. As shown in FIG. 10, an information transmission apparatus 1000 includes:

a configuring unit 1001 configured to be configured with and/or activated at least two configuration grants, the at least two configuration grants being respectively configured with corresponding hybrid automatic repeat request processes, or timers of hybrid automatic repeat request processes of the at least two configuration grants being respectively started or stopped according to configurations of the at least two configuration grants; and a transmitting unit 1002 configured to transmit uplink data or sidelink data by using the at least two configuration grants.

In an embodiment, the at least two configuration grants include a first configuration grant and a second configuration grant, at least one hybrid automatic repeat request process corresponding to the first configuration grant and at least one hybrid automatic repeat request process corresponding to the second configuration grant being at least partially different.

In an embodiment, as shown in FIG. 10, the apparatus 1000 may further include:

a receiving unit 1003 configured to receive configuration information transmitted by a network device, the configuration information configuring information of at least one hybrid automatic repeat request process for one of the configuration grants.

In an embodiment, the configuration information includes a configuration index of the configuration grant and a start identifier of at least one hybrid automatic repeat request process, and an identifier of the hybrid automatic repeat request process to which the configuration grant i corresponds may be calculated by using the following formula:

$$\text{HARQ Process ID}(i) = [\text{floor}(\text{CURRENT\_symbol}/\text{periodicity}(i))] \text{modulo}[\text{HARQ process start ID}(i+1) - \text{HARQ process start ID}(i)] + \text{HARQ process start ID}(i);$$

where, HARQ Process ID (i) is the identifier of the hybrid automatic repeat request process corresponding to the configuration grant i, floor( ) denotes a rounded down operation, modulo( ) denotes a modulo operation, CURRENT_symbol denotes a current symbol (index) where the configuration grant i is located, which may be, for example, calculated by using the following formula: CURRENT_symbol=(SFN×numberOfSlotsPerFrame×numberOfSymbolsPerSlot+(slot number in the frame)×numberOfSymbolsPerSlot+(symbol number in the slot)); where, numberOfSlotsPerFrame and numberOfSymbolsPerSlot refer to the number of consecutive slots of each radio frame and the number of consecutive symbols of each slot; periodicity (i) denotes a periodicity of the configuration grant i, HARQ process start ID (i) denotes the start identifier configured for the configuration grant i, and i denotes a configuration index of the configuration grant or an index of the configuration grant in a configuration grant list.

In an embodiment, the configuration information includes a configuration index of the configuration grant and an ending identifier of at least one hybrid automatic repeat request process, and an identifier of the hybrid automatic repeat request process to which the configuration grant i corresponds may be calculated by using the following formula:

$$\text{HARQ Process ID}(i) = [\text{floor}(\text{CURRENT\_symbol}/\text{periodicity}(i))] \text{modulo}[\text{HARQ process end ID}(i) - \text{HARQ process end ID}(i-1)] + \text{HARQ process end ID}(i-1) + 1;$$

where, HARQ Process ID (i) is the identifier of the hybrid automatic repeat request process corresponding to the configuration grant i, floor( ) denotes a rounded down operation, modulo( ) denotes a modulo operation, CURRENT_symbol denotes a current symbol (index) where the configuration grant i is located, which may be, for example, calculated by using the following formula: CURRENT_symbol=(SFN×numberOfSlotsPerFrame×numberOfSymbolsPerSlot+(slot number in the frame)×numberOfSymbolsPerSlot+(symbol number in the slot)); where, numberOfSlotsPerFrame and numberOfSymbolsPerSlot refer to the number of consecutive slots of each radio frame and the number of consecutive symbols of each slot; periodicity (i) denotes a periodicity of the configuration grant i, HARQ process end ID (i) denotes the end identifier configured for the configuration grant i, and i denotes a configuration index of the configuration grant or an index of the configuration grant in a configuration grant list.

In an embodiment, the configuration information includes a configuration index of the configuration grant and the number of the hybrid automatic repeat request processes, and an identifier of the hybrid automatic repeat request process to which the configuration grant i corresponds may be calculated by using the following formula:

$$\text{HARQ Process ID}(i) = [\text{floor}(\text{CURRENT\_symbol}/\text{periodicity}(i))] \text{modulo nrofHARQ-Processes}(i) + \text{sum}[\text{nrofHARQ-Processes}(0) + + \text{nrofHARQ-Processes}(i-1)];$$

where, HARQ Process ID (i) is the identifier of the hybrid automatic repeat request process corresponding to the configuration grant i, floor( ) denotes a rounded down operation, modulo( ) denotes a modulo operation, sum( ) denotes a summation operation, CURRENT_symbol denotes a current symbol (index) where the configuration grant i is located, which may be, for example, calculated by using the following formula: CURRENT_symbol=(SFN×numberOfSlotsPerFrame×numberOfSymbolsPerSlot+(slot number in the frame)×numberOfSymbolsPerSlot+(symbol number in the slot)); where, numberOfSlotsPerFrame and numberOfSymbolsPerSlot refer to the number of consecutive slots of each radio frame and the number of consecutive symbols of each slot; periodicity (i) denotes a periodicity of the configuration grant i, nrofHARQ-Processes (i) denotes the number of the hybrid automatic repeat request processes configured for the configuration grant i, and i denotes a configuration index of the configuration grant or an index of the configuration grant in a configuration grant list.

In an embodiment, the configuration information includes a configuration index of the configuration grant, a start identifier of at least one hybrid automatic repeat request process and the number of the hybrid automatic repeat request processes, and an identifier of the hybrid automatic repeat request process to which the configuration grant i corresponds may be calculated by using the following formula:

$$\text{HARQ Process ID}(i) = [\text{floor}(\text{CURRENT\_symbol}/\text{periodicity}(i))] \text{modulo nrofHARQ-Processes}(i) + \text{HARQ process start ID}(i);$$

where, HARQ Process ID (i) is the identifier of the hybrid automatic repeat request process corresponding to the configuration grant i, floor( ) denotes a rounded down operation, modulo( ) denotes a modulo operation, CURRENT_symbol denotes a current symbol (index) where the configuration grant i is located, which may be, for example, calculated by using the following formula: CURRENT_symbol=(SFN×numberOfSlotsPerFrame×numberOfSymbolsPerSlot+(slot number in the frame)×numberOfSymbolsPerSlot+(symbol number in the slot)); where, numberOfSlotsPerFrame and numberOfSymbolsPerSlot refer to the number of consecutive slots of each radio frame and the number of consecutive symbols of each slot; periodicity (i) denotes a periodicity of the configuration grant i, HARQ process start ID (i) denotes the start identifier configured for the configuration grant i, nrofHARQ-Processes (i) denotes the number of the hybrid automatic repeat request processes configured for the configuration grant i, and i denotes a configuration index of the configuration grant or an index of the configuration grant in a configuration grant list.

In an embodiment, the configuration information includes a configuration index of the configuration grant and an identifier of at least one hybrid automatic repeat request process, and the index of the hybrid automatic retransmission request process corresponding to the configuration grant i is calculated by using the following formula:

$$\text{HARQ Process index}(i) = [\text{floor}(\text{CURRENT\_symbol}/\text{periodicity}(i))] \text{modulo nrofHARQ-Processes}(i);$$

where, HARQ Process index (i) is the identifier of the hybrid automatic repeat request process corresponding to the configuration grant i, floor( ) denotes a rounded down operation, modulo( ) denotes a modulo operation, CUR- RENT_symbol denotes a current symbol (index) where the configuration grant i is located, which may be, for example, calculated by using the following formula: CURRENT_symbol=(SFN×numberOfSlotsPerFrame×numberOfSymbolsPerSlot+(slot number in the frame)×numberOfSymbolsPerSlot+(symbol number in the slot)); where, numberOfSlotsPerFrame and numberOfSymbolsPerSlot refer to the number of consecutive slots of each radio frame and the number of consecutive symbols of each slot; periodicity (i) denotes a periodicity of the configuration grant i, nrofHARQ-Processes (i) denotes the number of the hybrid automatic repeat request processes configured for the configuration grant i, and i denotes a configuration index of the configuration grant or an index of the configuration grant in a configuration grant list.

In an embodiment, the configuring unit 1001 may further determine an identifier of the hybrid automatic repeat request process corresponding to the configuration grant i according to HARQ Process index (i).

In an embodiment, the configuring unit 1001 may further be configured to: configure the hybrid automatic repeat request processes respectively for the at least two configuration grants according to the number of the hybrid automatic repeat request processes capable of being used by one of the configuration grants or a total number of the hybrid automatic repeat request processes capable of being used by the at least two configuration grants.

In an embodiment, the number of the hybrid automatic repeat request processes capable of being used by one of the configuration grants or the total number of the hybrid automatic repeat request processes capable of being used by the at least two configuration grants is predefined, or configured by the network device.

In an embodiment, an identifier of the hybrid automatic repeat request process to which the configuration grant i corresponds may be calculated by using the following formula:

$$\text{HARQ Process ID}(i) = [\text{floor}(\text{CURRENT\_symbol}/\text{periodicity}(i))] \text{ modulo } [\text{nrofHARQ-Processes}/\text{nrofconfiguredgrant}] + (\text{nrofHARQ-Processes}/\text{nrofconfiguredgrant}) * i;$$

where, HARQ Process index (i) is the identifier of the hybrid automatic repeat request process corresponding to the configuration grant i, floor( ) denotes a rounded down operation, modulo( ) denotes a modulo operation, CURRENT_symbol denotes a current symbol (index) where the configuration grant i is located, which may be, for example, calculated by using the following formula: CURRENT_symbol=(SFN×numberOfSlotsPerFrame×numberOfSymbolsPerSlot+(slot number in the frame)×numberOfSymbolsPerSlot+(symbol number in the slot)); where, numberOfSlotsPerFrame and numberOfSymbolsPerSlot refer to the number of consecutive slots of each radio frame and the number of consecutive symbols of each slot; periodicity (i) denotes a periodicity of the configuration grant i, nrofHARQ-Processes (i) denotes a total number of the hybrid automatic repeat request processes, nrofconfiguredgrant denotes the number of the at least two configuration grants, and i denotes a configuration index of the configuration grant or an index of the configuration grant in a configuration grant list.

In an embodiment, the number of the hybrid automatic repeat request processes capable of being used by one of the configuration grants is determined by a length of a timer of the configuration grant and a periodicity of the configuration grant.

In an embodiment, the at least two configuration grants include a first configuration grant and a second configuration grant, the first configuration grant and the second configuration grant using the same hybrid automatic repeat request process.

In an embodiment, the first configuration grant and the second configuration grant respectively use a timer of the same hybrid automatic repeat request process independently.

In an embodiment, the first configuration grant uses a first timer of the same hybrid automatic repeat request process, and the second configuration grant uses a second timer of the same hybrid automatic repeat request process.

In an embodiment, when the timer of the hybrid automatic repeat request process of the first configuration grant does not operate, the first configuration grant is used to transmit the uplink data or the sidelink data, and/or, when the timer of the hybrid automatic repeat request process of the second configuration grant does not operate, the second configuration grant is used to transmit the uplink data or the sidelink data.

It should be noted that the components or modules related to this disclosure are only described above. However, this disclosure is not limited thereto, and the information transmission apparatus 1000 may further include other components or modules, and reference may be made to related techniques for particulars of these components or modules.

Furthermore, for the sake of simplicity, connection relationships between the components or modules or signal profiles thereof are only illustrated in FIG. 10. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

It can be seen from the above embodiments that the terminal equipment is configured with and/or activated at least two configuration grants (CGs), the at least two configuration grants being respectively configured with corresponding HARQ processes, or timers of hybrid automatic repeat request processes of the at least two configuration grants being respectively started or stopped according to configurations of the at least two configuration grants. Hence, in a case where multiple uplink CGs or sidelink CGs are configured, CG resources is fully utilized, resource utilization is improved, throughput of data of different service types is increased, and the solution is simple to be implemented.

Embodiment 5

The embodiments of this disclosure provide an information reception apparatus. The apparatus may be a terminal equipment or a network device, or may be one or more components or assemblies configured in a terminal equipment or a network device. Contents in the embodiments identical to those in embodiments 1-4 shall not be described herein any further.

Figure 11:
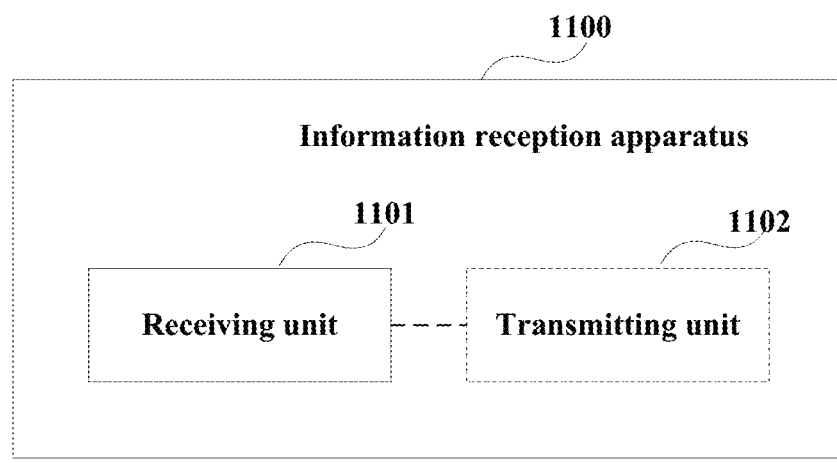
FIG. 11 is a schematic diagram of the information reception apparatus of an embodiment of this disclosure.

FIG. 11 is a schematic diagram of the information reception apparatus of the embodiment of this disclosure. As shown in FIG. 11, an information reception apparatus 1100 includes:

a receiving unit 1101 configured to receive uplink data or sidelink data transmitted by a terminal equipment by using at least two configuration grants, the terminal equipment being configured with and/or activated the at least two configuration grants, the at least two configuration grants being respectively configured with corresponding hybrid automatic repeat request processes, or timers of hybrid automatic repeat request processes of the at least two configuration grants being respectively started or stopped according to configurations of the at least two configuration grants.

In an embodiment, as shown in FIG. 11, the apparatus 1100 may further include:

a transmitting unit 1102 configured to transmit configuration information to the terminal equipment, the configuration information configuring information of at least one hybrid automatic repeat request process for one of the configuration grants.

It should be noted that the components or modules related to this disclosure are only described above. However, this disclosure is not limited thereto, and the information reception apparatus 1100 may further include other components or modules, and reference may be made to related techniques for particulars of these components or modules.

Furthermore, for the sake of simplicity, connection relationships between the components or modules or signal profiles thereof are only illustrated in FIG. 11. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

It can be seen from the above embodiments that the terminal equipment is configured with and/or activated at least two configuration grants (CGs), the at least two configuration grants being respectively configured with corresponding HARQ processes, or timers of hybrid automatic repeat request processes of the at least two configuration grants being respectively started or stopped according to configurations of the at least two configuration grants. Hence, in a case where multiple uplink CGs or sidelink CGs are configured, CG resources is fully utilized, resource utilization is improved, throughput of data of different service types is increased, and the solution is simple to be implemented.

Embodiment 6

The embodiments of this disclosure provide a communication system, and reference may be made to FIG. 1, with contents identical to those in embodiments 1-5 being not going to be described herein any further.

In an embodiment, the communication system 100 may at least include:

a first terminal equipment 102 configured to be configured with and/or activated at least two configuration grants, the at least two configuration grants being respectively configured with corresponding hybrid automatic repeat request processes, or timers of hybrid automatic repeat request processes of the at least two configuration grants being respectively started or stopped according to configurations of the at least two configuration grants; and a network device 101 configured to receive uplink data transmitted by the first terminal equipment by using the at least two configuration grants.

In another embodiment, the communication system 100 may at least include:

a first terminal equipment 102 configured to be configured with and/or activated at least two configuration grants, the at least two configuration grants being respectively configured with corresponding hybrid automatic repeat request processes, or timers of hybrid automatic repeat request processes of the at least two configuration grants being respectively started or stopped according to configurations of the at least two configuration grants; and a second terminal equipment 103 configured to receive sidelink data transmitted by the first terminal equipment by using the at least two configuration grants.

The embodiment of this disclosure further provides a network device, which may be, for example, a base station. However, this disclosure is not limited thereto, and it may also be another network device.

Figure 12:
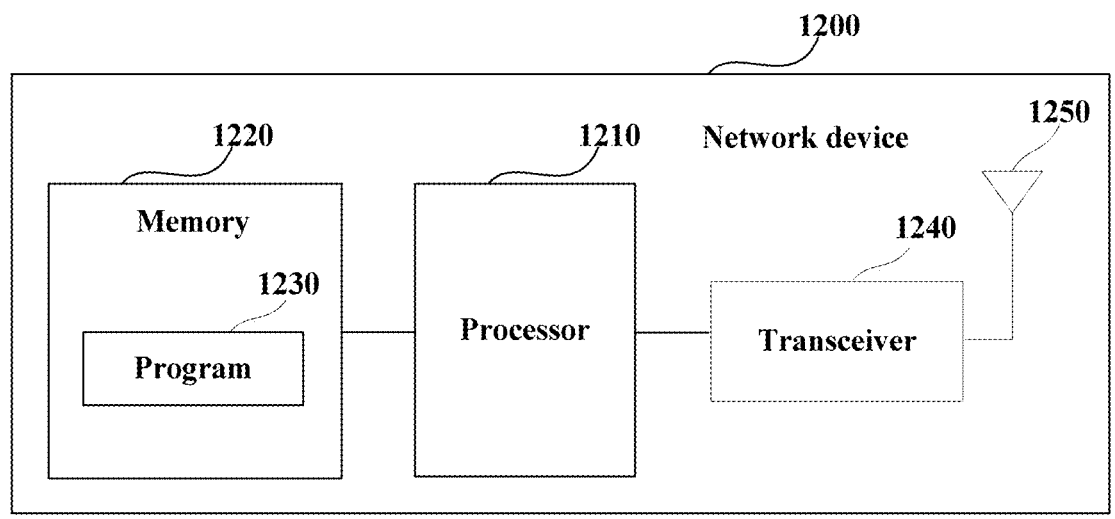
FIG. 12 is a schematic diagram of the network device of an embodiment of this disclosure.

FIG. 12 is a schematic diagram of a structure of the network device of the embodiment of this disclosure. As shown in FIG. 12, a network device 1200 may include a processor 1210 (such as a central processing unit (CPU)) and a memory 1220, the memory 1220 being coupled to the processor 1210. The memory 1220 may store various data, and furthermore, it may store a program 1230 for data processing, and execute the program 1230 under control of the processor 1210.

Furthermore, as shown in FIG. 12, the network device 1200 may include a transceiver 1240, and an antenna 1250, etc. Functions of the above components are similar to those in the relevant art, and shall not be described herein any further. It should be noted that the network device 1200 does not necessarily include all the parts shown in FIG. 12, and furthermore, the network device 1200 may include parts not shown in FIG. 12, and the relevant art may be referred to.

The embodiment of this disclosure further provides a terminal equipment; however, this disclosure is not limited thereto, and it may also be another equipment.

Figure 13:
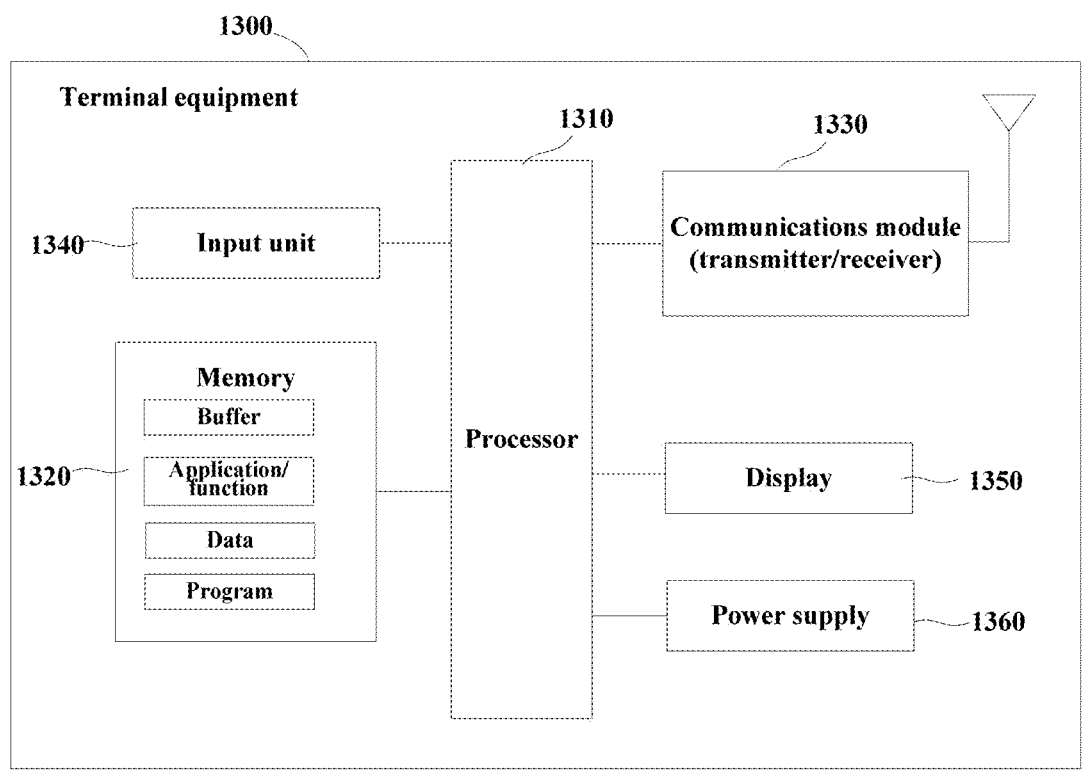
FIG. 13 is a schematic diagram of the terminal equipment of an embodiment of this disclosure.

FIG. 13 is a schematic diagram of the terminal equipment of the embodiment of this disclosure. As shown in FIG. 13, a terminal equipment 1300 may include a processor 1310 and a memory 1320, the memory 1320 storing data and a program and being coupled to the processor 1310. It should be noted that this figure is illustrative only, and other types of structures may also be used, so as to supplement or replace this structure and achieve a telecommunications function or other functions.

For example, the processor 1310 may be configured to execute a program to carry out the information transmission method as described in Embodiment 1. For example, the processor 1310 may be configured to perform the following control: being configured with and/or activated at least two configuration grants, the at least two configuration grants being respectively configured with corresponding hybrid automatic repeat request processes, or timers of hybrid automatic repeat request processes of the at least two configuration grants being respectively started or stopped according to configurations of the at least two configuration grants; and transmitting uplink data or sidelink data by using the at least two configuration grants.

As shown in FIG. 13, the terminal equipment 1300 may further include a communication module 1330, an input unit 1340, a display 1350, and a power supply 1360; functions of the above components are similar to those in the relevant art, which shall not be described herein any further. It should be noted that the terminal equipment 1300 does not necessarily include all the parts shown in FIG. 13, and the above components are not necessary. Furthermore, the terminal equipment 1300 may include parts not shown in FIG. 13, and the relevant art may be referred to.

An embodiment of the present disclosure provides a computer program, which, when executed in a terminal equipment, will cause the terminal equipment to carry out the information transmission method as described in Embodiment 1 or the information reception method as described in Embodiment 2.

An embodiment of this disclosure provides a storage medium, including a computer program, which will cause a terminal equipment to carry out the information transmission method as described in Embodiment 1 or the information reception method as described in Embodiment 2.

An embodiment of the present disclosure provides a computer program, which, when executed in a network device, will cause the network device to carry out the information reception method as described in Embodiment 2.

An embodiment of this disclosure provides a storage medium, including a computer program, which will cause a network device to carry out the information reception method as described in Embodiment 2.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present invention. Various variants and modifications may be made by those skilled in the art according to the spirits and principle of the present invention, and such variants and modifications fall within the scope of the present invention.

As to implementations containing the above embodiments, following supplements are further disclosed.

Supplement 1. An information transmission method, including:

a terminal equipment being configured with and/or activated at least two configuration grants (CGs), the at least two configuration grants being respectively configured with corresponding hybrid automatic repeat request processes; and transmitting uplink data or sidelink data by the terminal equipment by using the at least two configuration grants.

Supplement 2. The method according to supplement 1, wherein the at least two configuration grants include a first configuration grant and a second configuration grant, at least one HARQ process to which the first configuration grant corresponds and at least one HARQ process to which the second configuration grant corresponds being at least partially different.

Supplement 3. The method according to supplement 1 or 2, wherein the method further includes:

receiving configuration information transmitted by the network device, the configuration information configuring information on at least one HARQ process for one of the CGs.

Supplement 4. The method according to supplement 3, wherein the configuration information includes a configuration index of the configuration grant and a start identifier of at least one hybrid automatic repeat request process.

Supplement 5. The method according to supplement 4, wherein an identifier of the hybrid automatic repeat request process to which the configuration grant i corresponds is calculated by using the following formula:

HARQ Process ID($i$)=[floor(CURRENT_symbol/periodicity($i$))]modulo[HARQ process start ID($i$+1)−HARQ process start ID($i$)]+HARQ process start ID($i$);

where, HARQ Process ID ($i$) is the identifier of the hybrid automatic repeat request process corresponding to the configuration grant i, floor( ) denotes a rounded down operation, modulo( ) denotes a modulo operation, CURRENT_symbol denotes a current symbol where the configuration grant i is located, periodicity (i) denotes a periodicity of the configuration grant i, HARQ process start ID (i) denotes the start identifier configured for the configuration grant i, and i denotes a configuration index of the configuration grant or an index of the configuration grant in a configuration grant list.

Supplement 6. The method according to supplement 3, wherein the configuration information includes a configuration index of the configuration grant and at least one end identifier of the hybrid automatic repeat request process.

Supplement 7. The method according to supplement 6, wherein an identifier of the hybrid automatic repeat request process to which the configuration grant i corresponds is calculated by using the following formula:

HARQ Process ID($i$)=[floor(CURRENT_symbol/periodicity($i$))]modulo[HARQ process end ID($i$)−HARQ process end ID($i$−1)]+HARQ process end ID($i$−1)+1;

where, HARQ Process ID (i) is the identifier of the hybrid automatic repeat request process corresponding to the configuration grant i, floor( ) denotes a rounded down operation, modulo( ) denotes a modulo operation, CURRENT_symbol denotes a current symbol (index) where the configuration grant i is located, periodicity (i) denotes a periodicity of the configuration grant i, HARQ process end ID (i) denotes the end identifier configured for the configuration grant i, and i denotes a configuration index of the configuration grant or an index of the configuration grant in a configuration grant list.

Supplement 8. The method according to supplement 3, wherein the configuration information includes a configuration index of the configuration grant and the number of the hybrid automatic repeat request processes.

Supplement 9. The method according to supplement 8, wherein an identifier of the hybrid automatic repeat request process to which the configuration grant i corresponds may be calculated by using the following formula:

HARQ Process ID($i$)=[floor(CURRENT_symbol/periodicity($i$))]modulo nrofHARQ-Processes($i$)+sum[nrofHARQ-Processes(0)++nrofHARQ-Processes($i$−1)];

where, HARQ Process ID (i) is the identifier of the hybrid automatic repeat request process corresponding to the configuration grant i, floor( ) denotes a rounded down operation, modulo( ) denotes a modulo operation, sum( ) denotes a summation operation, CURRENT_symbol denotes a current symbol (index) where the configuration grant i is located, periodicity (i) denotes a periodicity of the configuration grant i, nrofHARQ-Processes (i) denotes the number of the hybrid automatic repeat request processes configured for the configuration grant i, and i denotes a configuration index of the configuration grant or an index of the configuration grant in a configuration grant list.

Supplement 10. The method according to supplement 3, wherein the configuration information includes the configuration index of the configuration grant, a start identifier of at least one of the hybrid automatic repeat request processes and the number of the hybrid automatic repeat request processes.

Supplement 11. The method according to supplement 10, wherein an identifier of the hybrid automatic repeat request process to which the configuration grant i corresponds is calculated by using the following formula:

HARQ Process ID($i$)=[floor(CURRENT_symbol/periodicity($i$))]modulo nrofHARQ-Processes($i$)+HARQ process start ID($i$);

where, HARQ Process ID (i) is the identifier of the hybrid automatic repeat request process corresponding to the configuration grant i, floor( ) denotes a rounded down operation, modulo( ) denotes a modulo operation, CURRENT_symbol denotes a current symbol (index) where the configuration grant i is located, periodicity (i) denotes a periodicity of the configuration grant i, HARQ process start ID (i) denotes the start identifier configured for the configuration grant i, nrofHARQ-Processes (i) denotes the number of the hybrid automatic repeat request processes configured for the configuration grant i, and i denotes a configuration index of the configuration grant or an index of the configuration grant in a configuration grant list.

Supplement 12. The method according to supplement 3, wherein the configuration information includes a configuration index of the configuration grant and an identifier of at least one of the hybrid automatic repeat request processes.

Supplement 13. The method according to supplement 12, wherein the index of the hybrid automatic retransmission request process corresponding to the configuration grant i is calculated by using the following formula:

HARQ Process index($i$)=[floor(CURRENT_symbol/periodicity($i$))]modulo nrofHARQ-Processes($i$);

where, HARQ Process index (i) is the identifier of the hybrid automatic repeat request process corresponding to the configuration grant i, floor( ) denotes a rounded down operation, modulo( ) denotes a modulo operation, CURRENT_symbol denotes a current symbol (index) where the configuration grant i is located, periodicity (i) denotes a periodicity of the configuration grant i, nrofHARQ-Processes (i) denotes the number of the hybrid automatic repeat request processes configured for the configuration grant i, and i denotes a configuration index of the configuration grant or an index of the configuration grant in a configuration grant list.

Supplement 14. The method according to supplement 13, wherein the terminal equipment determines the identifier of the hybrid automatic repeat request process corresponding to the configuration grant i according to the HARQ Process index (i).

Supplement 15. The method according to supplement 1 or 2, wherein the method further includes:

configuring HARQ processes respectively for the at least two configuration grants by the terminal equipment according to the number of HARQ processes capable of being used by a configuration grant or a total number of HARQ processes capable of being used by the at least two configuration grants.

Supplement 16. The method according to supplement 15, wherein the number of HARQ processes capable of being used by the configuration grant or the total number of HARQ processes capable of being used by the at least two configuration grants is predefined, or is configured by the network device.

Supplement 17. The method according to supplement 15, wherein an identifier of the hybrid automatic repeat request process to which the configuration grant i corresponds is calculated by using the following formula:

HARQ Process ID($i$)=[floor(CURRENT_symbol/periodicity($i$))]modulo [nrofHARQ-Processes/nrofconfiguredgrant]+(nrofHARQ-Processes/nrofconfiguredgrant)*$i$;

where, HARQ Process index (i) is the identifier of the hybrid automatic repeat request process corresponding to the configuration grant i, floor( ) denotes a rounded down operation, modulo( ) denotes a modulo operation, CURRENT_symbol denotes a current symbol (index) where the configuration grant i is located, periodicity (i) denotes a periodicity of the configuration grant i, nrofHARQ-Processes (i) denotes a total number of the hybrid automatic repeat request processes, nrofconfiguredgrant denotes the number of the at least two configuration grants, and i denotes a configuration index of the configuration grant or an index of the configuration grant in a configuration grant list.

Supplement 18. The method according to supplement 15, wherein the number of HARQ processes capable of being used by the configuration grant is determined by a length of a timer of the configuration grant and a periodicity of the configuration grant.

Supplement 19. An information transmission method, including:
a terminal equipment being configured with and/or activated at least two configuration grants, timers of hybrid automatic repeat request processes of the at least two configuration grants being respectively started or stopped according to configurations of the at least two configuration grants; and
transmitting uplink data or sidelink data by the terminal equipment by using the at least two configuration grants.

Supplement 20. The method according to supplement 19, wherein the at least two configuration grants include a first configuration grant and a second configuration grant, the first configuration grant and the second configuration grant using the same hybrid automatic repeat request process.

Supplement 21. The method according to supplement 20, wherein the first configuration grant and the second configuration grant respectively use a timer of the same hybrid automatic repeat request process independently.

Supplement 22. The method according to supplement 20, wherein the first configuration grant uses the first timer of the same hybrid automatic repeat request process, and the second configuration grant uses the second timer of the same hybrid automatic repeat request process.

Supplement 23. The method according to supplement 20, wherein when the timer of the hybrid automatic repeat request process of the first configuration grant does not operate, the first configuration grant and a related hybrid automatic repeat request process are used to transmit the uplink data or the sidelink data, and/or,
when the timer of the hybrid automatic repeat request process of the second configuration grant does not operate, the second configuration grant and a related hybrid automatic repeat request process are used to transmit the uplink data or the sidelink data.

Supplement 24. An information reception method, including:
receiving, by a network device or a second terminal equipment, uplink data or sidelink data transmitted by a first terminal equipment by using at least two configuration grants (CGs);
wherein the first terminal equipment is configured with and/or activated the at least two configuration grants, and the at least two configuration grants are respectively configured with corresponding hybrid automatic repeat request processes.

Supplement 25. The method according to supplement 24, wherein the at least two configuration grants include a first configuration grant and a second configuration grant, at least one hybrid automatic repeat request process corresponding to the first configuration grant and at least one hybrid automatic repeat request process corresponding to the second configuration grant being at least partially different.

Supplement 26. The method according to supplement 24 or 25, wherein the method further includes:
transmitting configuration information by the network device to the first terminal equipment, the configuration information configuring information of at least one hybrid automatic repeat request process for one of the configuration grants.

Supplement 27. An information reception method, including:
receiving, by a network device or a second terminal equipment, uplink data or sidelink data transmitted by a first terminal equipment by using at least two configuration grants (CGs),
wherein the first terminal equipment is configured with and/or activated the at least two configuration grants, and timers of hybrid automatic repeat request processes of the at least two configuration grants are respectively started or stopped according to configurations of the at least two configuration grants.

Supplement 28. The method according to supplement 27, wherein the at least two configuration grants include a first configuration grant and a second configuration grant, the first configuration grant and the second configuration grant using the same hybrid automatic repeat request process.

Supplement 29. A terminal equipment, including a memory and a processor, the memory storing a computer program, and the processor being configured to execute the computer program to carry out the information transmission method as described in any one of supplements 1-23 or the information reception method as described in any one of supplements 24-28.

Supplement 30. A network device, including a memory and a processor, the memory storing a computer program, and the processor being configured to execute the computer program to carry out the information reception method as described in any one of supplements 24-28.

Supplement 31. A communication system, including:
a first terminal equipment configured to be configured with and/or activated at least two configuration grants, the at least two configuration grants being respectively configured with corresponding hybrid automatic repeat request processes, or timers of hybrid automatic repeat request processes of the at least two configuration grants being respectively started or stopped according to configurations of the at least two configuration grants; and
a network device configured to receive uplink data transmitted by the first terminal equipment by using the at least two configuration grants.

Supplement 32. A communication system, including:
a first terminal equipment configured to be configured with and/or activated at least two configuration grants, the at least two configuration grants being respectively configured with corresponding hybrid automatic repeat request processes, or timers of hybrid automatic repeat request processes of the at least two configuration grants being respectively started or stopped according to configurations of the at least two configuration grants; and
a second terminal equipment configured to receive sidelink data transmitted by the first terminal equipment by using the at least two configuration grants.

What is claimed is:
1. An information transmission apparatus, comprising:
a receiver configured to receive configuration information transmitted by a network device, the configuration information configuring information of at least one hybrid automatic repeat request process for one of at least two configuration grants;
a processor configured to be configured with and activated, or, configured with or activated the at least two configuration grants, the at least two configuration grants being respectively configured with corresponding hybrid automatic repeat request processes; and
a transmitter configured to transmit uplink data or sidelink data by using the at least two configuration grants;
wherein the configuration information comprises a configuration index of the configuration grant, a start identifier of at least one hybrid automatic repeat request process and the number of the hybrid automatic repeat request processes;

and an identifier of a hybrid automatic repeat request process corresponding to the configuration grant i is calculated by using the following formula:

HARQ Process ID(i)=[floor(CURRENT symbol/periodicity(i))]modulo nrofHARQ-Processes(i)+ HARQ process start ID(i);

where, HARQ Process ID (i) is the identifier of the hybrid automatic repeat request process corresponding to the configuration grant i, floor( )denotes a rounded down operation, modulo( )denotes a modulo operation, CURRENT symbol denotes a current symbol where the configuration grant i is located, periodicity (i) denotes a periodicity of the configuration grant i, HARQ process start ID (i) denotes the start identifier configured for the configuration grant i, and nrofHARQ-Processes (i) denotes the number of the hybrid automatic repeat request processes configured for the configuration grant i.

2. The apparatus according to claim 1, wherein the at least two configuration grants comprise a first configuration grant and a second configuration grant, at least one hybrid automatic repeat request process corresponding to the first configuration grant and at least one hybrid automatic repeat request process corresponding to the second configuration grant being at least partially different.

3. An information transmission apparatus, comprising:
a receiver configured to receive configuration information transmitted by a network device, the configuration information configuring information of at least one hybrid automatic repeat request process for one of at least two configuration grants;
processor circuitry configured to be configured with activated, or, configured with or activated the at least two configuration grants, timers of hybrid automatic repeat request processes of the at least two configuration grants being respectively started or stopped according to configurations of the at least two configuration grants; and
a transmitter configured to transmit uplink data or sidelink data by using the at least two configuration grants;
wherein the configuration information comprises a configuration index of the configuration grant, a start identifier of at least one hybrid automatic repeat request process and the number of the hybrid automatic repeat request processes;
and an identifier of a hybrid automatic repeat request process corresponding to the configuration grant i is calculated by using the following formula:

HARQ Process ID(i)=[floor(CURRENT symbol/periodicity(i))] modulo nrofHARQ-Processes (i)+ HARQ process start ID (i);

where, HARQ Process ID (i) is the identifier of the hybrid automatic repeat request process corresponding to the configuration grant i, floor( )denotes a rounded down operation, modulo( )denotes a modulo operation, CURRENT symbol denotes a current symbol where the configuration grant i is located, periodicity (i) denotes a periodicity of the configuration grant i, HARQ process start ID (i) denotes the start identifier configured for the configuration grant i, and nrofHARQ-Processes (i) denotes the number of the hybrid automatic repeat request processes configured for the configuration grant i.

4. The apparatus according to claim 3, wherein the at least two configuration grants comprise a first configuration grant and a second configuration grant, the first configuration grant and the second configuration grant using the same hybrid automatic repeat request process.

5. The apparatus according to claim 4, wherein the first configuration grant and the second configuration grant respectively use a timer of the same hybrid automatic repeat request process independently.

6. The apparatus according to claim 4, wherein the first configuration grant uses a first timer of the same hybrid automatic repeat request process, and the second configuration grant uses a second timer of the same hybrid automatic repeat request process.

7. The apparatus according to claim 4, wherein when the timer of the hybrid automatic repeat request process of the first configuration grant does not operate, the first configuration grant is used to transmit the uplink data or the sidelink data.

8. The apparatus according to claim 4, wherein when the timer of the hybrid automatic repeat request process of the second configuration grant does not operate, the second configuration grant is used to transmit the uplink data or the sidelink data.

9. An information reception apparatus, comprising:
a receiver configured to receive uplink data or sidelink data transmitted by a terminal equipment by using at least two configuration grants, the terminal equipment being configured to receive configuration information transmitted by a network device, wherein the configuration information configures information of at least one hybrid automatic repeat request process for one of configuration grants; and the terminal equipment is further configured to configured with and activated, or, configured with or activated with activated, or, configured with or activated the at least two configuration grants,
the at least two configuration grants being respectively configured with corresponding hybrid automatic repeat request processes, or, timers of hybrid automatic repeat request processes of the at least two configuration grants being respectively started or stopped according to configurations of the at least two configuration grants;
wherein the configuration information comprises a configuration index of the configuration grant, a start identifier of at least one hybrid automatic repeat request process and the number of the hybrid automatic repeat request processes;
and an identifier of a hybrid automatic repeat request process corresponding to the configuration grant i is calculated by using the following formula:

HARQ Process ID (i)=[floor(CURRENT symbol/periodicity(i))] modulo nrofHARQ-Processes (i)+HARQ process start ID (i);

where, HARQ Process ID (i) is the identifier of the hybrid automatic repeat request process corresponding to the configuration grant i, floor( )denotes a rounded down operation, modulo( )denotes a modulo operation, CURRENT symbol denotes a current symbol where the configuration grant i is located, periodicity (i) denotes a periodicity of the configuration grant i, HARQ process start ID (i) denotes the start identifier configured for the configuration grant i, and nrofHARQ-Processes (i) denotes the number of the hybrid automatic repeat request processes configured for the configuration grant i.

* * * * *